L. R. FAUGHT.
REGULATOR FOR STEAM ENGINES.
No. 10,185. Patented Nov. 1, 1853.
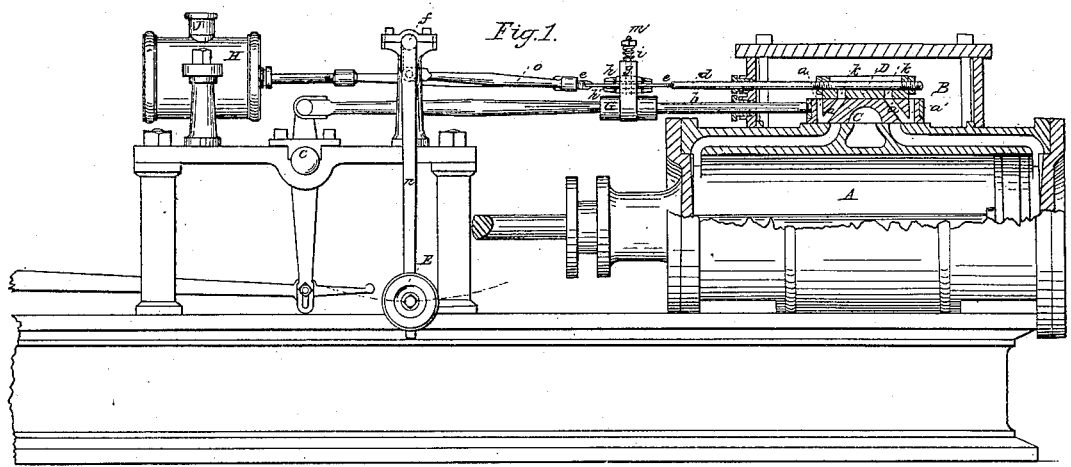
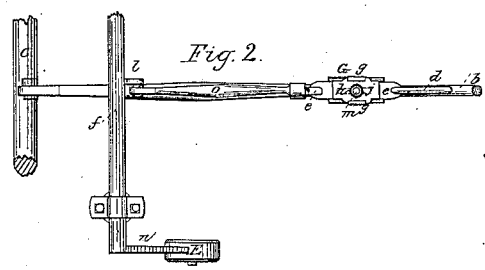
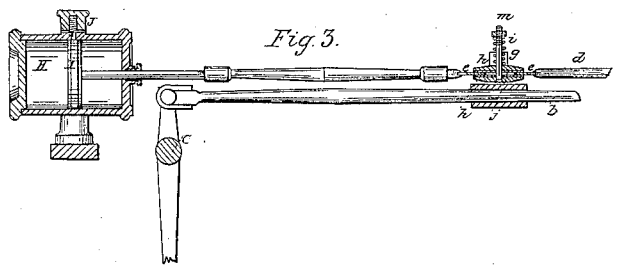

UNITED STATES PATENT OFFICE.

L. R. FAUGHT, OF MACON, GEORGIA.

REGULATING THE SPEED OF STEAM-ENGINES.

Specification of Letters Patent No. 10,185, dated November 1, 1853.

*To all whom it may concern:*

Be it known that I, LUTHER R. FAUGHT, of Macon, in the county Bibb and State of Georgia, have invented a new and useful Improvement in Regulators for Regulating the Speed of Steam-Engines; and I do hereby declare that the following is a full, clear, and exact description of the same, reference being had to the accompanying drawings, making a part of this specification, in which—

Figure 1, is a side elevation, partly sectional, of the cylinder, valve, and "cut-off," of a steam-engine with appendages which constitute my invention. Fig. 2, is a top view of the same of the parts shown in Fig. 1. Fig. 3, is a side view, partly sectional, of a modification of the invention, which is also partly shown in red color in Fig. 1.

Similar letters of reference indicate corresponding parts, in each of the several figures.

In this regulator, the speed of the engine is goverened by the "cut-off," which consists of a plate of metal, faced to fit and work on the back of the slide valve, which is furnished with certain openings through which the steam can only be admitted to the cylinder while the "cut-off" plate is in a proper position. The above form of "cut-off" is not in itself new; but my invention relates to certain means of controlling the operation of such a "cut-off," so as to make it effective in regulating the speed of the engine.

The nature of my invention consists in causing the "cut-off" to move with the valve, by means of friction produced between them by suitable means, and attaching the former to a pendulum, or other device which is capable of offering to its movement a resistance, which causes it to move a shorter distance than the valve, and thus close the steam openings of the valve, and cut off the steam before the termination of the stroke of the engine, and which increases or diminishes with the increase or diminution of speed of the engine, so as to close the passages and cut off the steam earlier or later, as may be required, and thus regulate the speed of the engine.

To enable those skilled in the art to make and use my invention, I will now proceed to describe the construction and operation of the same.

A, is the engine-cylinder; and B, is the valve-box.

C, is the valve, which is of the kind known as the "short slide," but differs from those of ordinary construction, in being extended beyond the usual length, and having passages, $a$, $a$, and $a'$, $a'$, near to and at corresponding distances from each end. Each two of these passages, $a$, $a$, and $a'$, $a'$, unite in a single opening in the face of the valve, though there are two openings on the back. The inner edges of the openings in the face correspond to the ends of the common valve. The reason for making two openings in the back, is, that the passages may be opened and closed by a less movement of the valve and "cut-off," relatively to each other. The valve receives the usual motion by a rod, $b$, from the way shaft, $c$, or any other suitable means.

D, is the "cut-off," which fits to the back of the valve, and is of such length, that it will cover the space between the openings of the endmost passages, $a$, and $a'$, and leave both said openings exposed; and it has two passages, $k$, $k$, which correspond with the inmost passages, $a$, and $a'$, when the endmost ones are both uncovered, as shown in Fig. 1. The "cut-off" is attached to a rod, $d$, which works through a stuffing-box in the valve chest, at the same end as, and parallel with, the valve-rod. The rod, $d$, is flattened at one part, $e$, $e$, to be received in the friction-box which connects it with the valve-rod. In Figs. 1 and 2 the rod, $d$, is shown connected by a link, $o$, with a short arm, $l$, on a rock-shaft, $f$, from which a pendulum, E, is suspended. The friction-box consists of a boss, G, secured to the valve-rod, and having two horns, $g$, $g$, standing up to form guides for two metal friction plates, $h$, $h$, between which the flattened part of the "cut-off" rod is received; the plates being faced with leather, in order to better regulate and equalize the friction. The said friction is produced by a spiral spring, $i$, wound around a bolt, $m$, which is secured to the boss, G, and passes through the valve-rod and friction plates; the friction being regulated by a nut, on the top of the bolt, which increases or diminishes the effect of the spring. A slot, *j*, shown in Fig. 3, and dotted in Fig. 2, is made in the "cut-off" rod, to prevent the bolt from interfering with its longitudinal movement, independently of the friction plates.

The pendulum is so attached to the "cut-off," that it hangs vertically, when the valve is at the center of its motion, and that the "cut-off" is then central to the valve, as shown in the drawing; both the passages, *a, a*, and *a', a'*, being open. The friction between the valve and "cut-off," combined with that of the friction-box, gives motion to the "cut-off," when the valve moves, and acts as the maintaining power of the pendulum. Now, in order to make the "cut-off" close the passages, its movement relatively with the valve has to be retarded; but, if the pendulum were of such length as would, when hanging free, oscillate synchronously with the reciprocating movements of the valve, when the engine made the desired number of revolutions, a very little friction would suffice to make the valve and "cut-off" move together always the same distance and with no alteration in their relation to each other; and in that case the "cut-off" would remain inoperative; it is therefore necessary to make the pendulum longer, in order that it may, by reason of its tendency to a slower movement, offer a resistance to the motion of the "cut-off," greater than the friction aforesaid, is able to overcome. The resistance thus offered retards the motion of the "cut-off," sufficiently to prevent its moving the same distance as the valve, although the movements of both are performed synchronously with each other. The friction of the friction-box is so regulated by the nut above the spring, as to make the length of the motion of the "cut-off" just sufficient to cut off the steam at the required point in the stroke of the engine to produce the required number of revolutions.

The effect of the retarded motion of the "cut-off" may be understood by supposing the valve and "cut-off" to commence moving from the position shown in Fig. 1, of the drawing, in the direction of the arrow, 1; the pendulum at the same time oscillating in the direction of the arrow, 2. When both leave that position together, the steam port commences opening and is opened fully; but, in time, the more rapid motion of the valve carries the passages, *a', a'*, under the closed or unperforated part of the "cut-off" plate, and no steam can then enter the port. A similar effect is produced, during their motion in the opposite direction.

The speed of the engine is regulated by the increasing or decreasing resistance offered by the pendulum to the movement of the "cut-off," consequent upon an accelerated or retarded movement of the engine. An increase of speed causes the pendulum to offer an increased resistance to its maintaining power, viz, the friction; and the distance of its oscillation is thereby reduced; thus reducing the length of the motion of the "cut-off," and closing the passages at an earlier point in the motion of the valve. A decrease of speed produces an opposite effect, by diminishing the resistance of the pendulum, as the duration of its oscillation then approximates nearer to the time which would be required for it to oscillate when free.

The pendulum, E, can only be applied effectively to stationary engines; but, in engines for steam vessels and locomotives, I propose to substitute an air-spring, consisting of a cylinder, H, which, together with its appendages, is shown in red color in Fig. 1, and also in Fig. 3. This is mounted on a suitable frame, with its axis in line with the "cut-off" rod; it is furnished with a piston, I, which fits loosely so as to leave some space all around; and the said piston is connected with the "cut-off" rod, by any suitable connection. The cylinder has also a regulating cock, J, by which the escape of air, to and fro, may be regulated. The "cut-off" is made to act, in this case, by means of the air, which it compresses on one side of the piston of the air-cylinder, and the partial exhaustion it produces on the opposite side, during its movement with the valve; and when these become sufficient to balance the friction of the valve and friction-box, it is arrested in its movement; and the continuation of the movement of the slide valve cuts off the steam.

In order to adjust the air-spring, to arrest the "cut-off," at the proper point in the motion of the valve, the regulating cock is closed at the commencement of the motion of the engine; and the engine, owing to the resistance of the confined air in the cylinder, commences working slowly. The regulating cock is then opened, to regulate the escape and admission of air, until the "cut-off" is set free from the valve at the proper time to bring the engine to its desired speed. Any tendency to increase the speed of the engine causes the piston in the air cylinder to meet with an increased resistance, and therefore arrest the "cut-off" earlier in the stroke; and any retarding tendency produces an opposite effect.

I do not confine myself to the employment of a pendulum or air spring; as there may be other devices that would produce analogous effects. Neither do I confine myself to the precise methods of producing friction herein described; as both the methods that I have shown are well known, viz, by the pressure of the steam in the valve chest, and by plates compressed to the rod by a spring. Nor do I confine myself to the adjustment of the relation between the pendulum and the device or devices which produce the friction; as it will be evident that the lengthening or shortening of the pendulum will produce the same effect. But What I do claim as my invention, and desire to secure by Letters Patent, is,—

Connecting the "cut-off," D, with the slide valve, C, so that the latter drives the former by friction, when the "cut-off" is at the same time connected with a pendulum, air spring, or some other device offering such a resistance to its movement, as will prevent its moving the same distance as the valve, and arrest it at such a point in the motion of the valve, as to cut off the steam at the desired point in the stroke, and will increase or diminish with any increase or diminution of the speed of the engine, and thereby retard the motion of the "cut-off," more or less, in order to cut off the steam earlier or later in the stroke, and thus to regulate the speed, substantially as described.

L. R. FAUGHT.

Witnesses:
ROBERT A. FINDLAY,
ROBERT S. LANIER.